United States Patent
Aluru et al.

(10) Patent No.: US 12,351,182 B2
(45) Date of Patent: Jul. 8, 2025

(54) SYSTEM AND METHOD TO NEUTRALIZE THE PRESENCE OF ADVERSE WEATHER ARTIFACTS FROM AUTOMOTIVE CAMERA IMAGERY

(71) Applicant: GM GLOBAL TECHNOLOGY OPERATIONS LLC, Detroit, MI (US)

(72) Inventors: Sai Vishnu Aluru, Commerce Township, MI (US); Daniel Woodall, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 18/176,790

(22) Filed: Mar. 1, 2023

(65) Prior Publication Data

US 2024/0294171 A1  Sep. 5, 2024

(51) Int. Cl.
*B60W 40/02* (2006.01)
*G01W 1/10* (2006.01)
*G06T 7/254* (2017.01)
*G06V 20/56* (2022.01)

(52) U.S. Cl.
CPC ............. *B60W 40/02* (2013.01); *G01W 1/10* (2013.01); *G06T 7/254* (2017.01); *G06V 20/56* (2022.01); *B60W 2420/403* (2013.01); *B60W 2555/20* (2020.02)

(58) Field of Classification Search
CPC ............. B60W 40/02; B60W 2555/20; B60W 2420/403; G01W 1/10; G01W 2203/00; H04N 23/81; G06T 7/254; G06T 2207/30248
See application file for complete search history.

(56) References Cited

U.S. PATENT DOCUMENTS

| | | | | |
|---|---|---|---|---|
| 9,465,987 B1* | 10/2016 | Bell | ................ | G06V 20/588 |
| 10,497,129 B1* | 12/2019 | Cui | ................ | H04N 23/81 |
| 2010/0157076 A1* | 6/2010 | Garg | ................ | H04N 23/633 |
| | | | | 348/E5.042 |
| 2013/0208120 A1* | 8/2013 | Hirai | ................ | H04N 7/18 |
| | | | | 348/148 |
| 2014/0363045 A1* | 12/2014 | Wu | ................ | G06T 5/70 |
| | | | | 382/103 |
| 2015/0117705 A1* | 4/2015 | Zhang | ................ | G06T 7/254 |
| | | | | 382/103 |
| 2015/0178902 A1* | 6/2015 | Lee | ................ | G06T 5/77 |
| | | | | 382/104 |
| 2016/0148383 A1* | 5/2016 | Cerqueira | ................ | G01W 1/14 |
| | | | | 382/194 |
| 2019/0180423 A1* | 6/2019 | Lukac | ................ | G06T 5/92 |
| 2019/0219691 A1* | 7/2019 | Meehan | ................ | G01S 13/865 |
| 2020/0049856 A1* | 2/2020 | Allamano | ................ | G06T 7/11 |
| 2021/0183026 A1* | 6/2021 | Auner | ................ | G06T 5/92 |

(Continued)

*Primary Examiner* — Thomas E Worden
*Assistant Examiner* — Benjamin J Brosh
(74) *Attorney, Agent, or Firm* — Lorenz & Kopf LLP (57) ABSTRACT

Methods and systems are provided that include obtaining camera images from a camera of a vehicle; obtaining weather data as to a location in which the vehicle is travelling; processing the camera images, via a processor, generating one or more processed frames from the camera images, based on the weather data; and performing a control action for the vehicle, in accordance with instructions provided by the processor, based on the one or more processed frames.

20 Claims, 3 Drawing Sheets

(56) References Cited

U.S. PATENT DOCUMENTS

| | | | |
|---|---|---|---|
| 2022/0172464 A1* | 6/2022 | Ross | B63B 49/00 |
| 2022/0266852 A1* | 8/2022 | Khayyer | B60W 40/08 |
| 2023/0215151 A1* | 7/2023 | Yamamoto | G06V 10/776 |
| | | | 382/159 |
| 2023/0247309 A1* | 8/2023 | Somanath | B60R 1/22 |
| | | | 348/148 |

* cited by examiner

SYSTEM AND METHOD TO NEUTRALIZE THE PRESENCE OF ADVERSE WEATHER ARTIFACTS FROM AUTOMOTIVE CAMERA IMAGERY

TECHNICAL FIELD

The technical field generally relates to vehicles and, more specifically, to systems and methods for controlling automotive camera images when adverse weather artifacts are present.

BACKGROUND

Certain vehicles today have cameras that provide camera images for the vehicle and for a driver or other occupants of the vehicle. However, existing techniques may not always provide optimal camera images, for weather during adverse weather conditions.

Accordingly, it is desirable to provide improved methods and systems for controlling vehicle images, including during adverse weather conditions. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes obtaining camera images from a camera of a vehicle; obtaining weather data as to a location in which the vehicle is travelling; processing the camera images, via a processor, generating one or more processed frames from the camera images, based on the weather data; and performing a control action for the vehicle, in accordance with instructions provided by the processor, based on the one or more processed frames.

Also in an exemplary embodiment the step of obtaining the weather data includes obtaining one or more current weather values from a remote server, using a navigation system of the vehicle; and the step of processing the camera images includes processing the camera images, via the processor, based on the one or more current weather values obtained from the remote server.

Also in an exemplary embodiment, the method further includes determining whether precipitation is reflected in the camera images, based on the one or more current weather values and an evaluation of the camera images by the processor; wherein the step of processing the camera images includes filtering the camera images based on the precipitation, via the processor.

Also in an exemplary embodiment, the method further includes determining, via the processor using the weather data, whether precipitation is present; and substituting frames of the camera images in which the precipitation is present.

Also in an exemplary embodiment, the substituting of the frames is performed based on a difference frame that is determined via the processor based on differences between a first frame obtained at a first point in time and a second frame obtained at a second point in time.

Also in an exemplary embodiment, the method further includes removing pixels that are present in the difference frame and that reflect the precipitation.

Also in an exemplary embodiment, the step of performing the control action includes displaying the one or more processed frames on a screen of a display of the vehicle, in accordance with the instructions provided by the processor.

Also in an exemplary embodiment, the step of performing the control action includes automatically controlling movement of the vehicle based on the one or more processed frames, in accordance with the instructions provided by the processor.

In another exemplary embodiment, a system is provided that includes a camera configured to obtain camera images for a vehicle; a processor coupled to the camera and configured to at least facilitate: obtaining weather data as to a location in which the vehicle is travelling; processing the camera images, generating one or more processed frames from the camera images, based on the weather data; and performing a control action for the vehicle, in accordance with instructions provided by the processor, based on the one or more processed frames.

Also in an exemplary embodiment, the processor is configured to at least facilitate: obtaining one or more current weather values from a remote server, using a navigation system of the vehicle; and processing the camera images based on the one or more current weather values obtained from the remote server.

Also in an exemplary embodiment, the processor is configured to at least facilitate: determining whether precipitation is reflected in the camera images, based on the one or more current weather values and an evaluation of the camera images; and filtering the camera images based on the precipitation.

Also in an exemplary embodiment, the processor is configured to at least facilitate: determining, using the weather data, whether precipitation is present; and substituting frames of the camera images in which the precipitation is present.

Also in an exemplary embodiment, the processor performs the substituting of the frames based on a difference frame that is determined via the processor based on differences between a first frame obtained at a first point in time and a second frame obtained at a second point in time.

Also in an exemplary embodiment, the processor is configured to at least facilitate removing pixels that are present in the difference frame and that reflect the precipitation.

Also in an exemplary embodiment, the processor is configured to at least facilitate displaying the one or more processed frames on a screen of a display of the vehicle, in accordance with the instructions provided by the processor.

Also in an exemplary embodiment, the processor is configured to at least facilitate automatically controlling movement of the vehicle based on the one or more processed frames, in accordance with the instructions provided by the processor.

In another exemplary embodiment, a vehicle is provided that includes a body; a drive system configured to generate movement of the body; a camera disposed on or within the body and configured to obtain camera images; and a processor disposed within the body and coupled to the camera, the processor and configured to at least facilitate: obtaining weather data as to a location in which the vehicle is travelling; processing the camera images, generating one or more processed frames from the camera images, based on the weather data; and performing a control action for the vehicle, in accordance with instructions provided by the processor, based on the one or more processed frames.

Also in an exemplary embodiment, the vehicle further includes a navigation system configured to obtain one or more current weather values from a remote server; wherein the processor is coupled to the navigation system and configured to at least facilitate processing the camera images based on the one or more current weather values obtained via the navigation system from the remote server.

Also in an exemplary embodiment, the processor is configured to at least facilitate: determining whether precipitation is reflected in the camera images, based on the one or more current weather values and an evaluation of the camera images; and filtering the camera images based on the precipitation.

Also in an exemplary embodiment, the processor is configured to at least facilitate: determining using the weather data, whether precipitation is present; substituting frames of the camera images in which the precipitation is present based on a difference frame that is determined via the processor based on differences between a first frame obtained at a first point in time and a second frame obtained at a second point in time; and removing pixels that are present in the difference frame and that reflect the precipitation.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
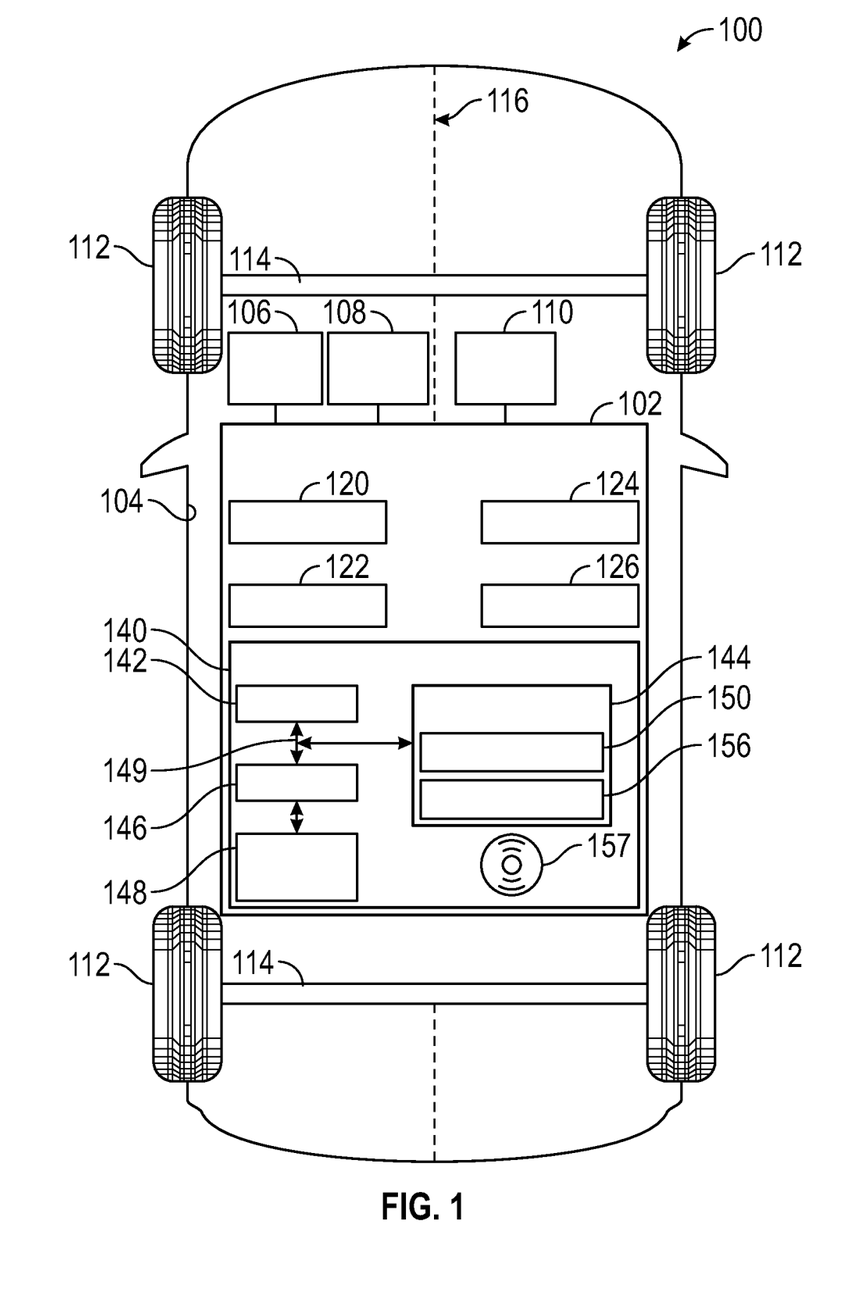
FIG. 1 is a functional block diagram of a vehicle having a control system for controlling camera images, including during adverse weather conditions, in accordance with exemplary embodiments.

FIG. 1 illustrates a vehicle 100. In various embodiments, and as described below, the vehicle 100 includes a control system 102 for controlling camera images for the vehicle 100 and for users thereof, including based on weather conditions, in accordance with an exemplary embodiment.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control (including acceleration, deceleration, braking, and/or steering) is automatically planned and executed by the control system 102, in whole or in part. In certain other embodiments, the vehicle 100 may be operated in whole or in part by a human driver.

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions controlled automatically via the control system 102. In certain embodiments, the vehicle 100 comprises an autonomous vehicle, such as a semi-autonomous vehicle or a fully autonomous vehicle, for automated control of the drive system 110 and/or other vehicle components. However, this may vary in other embodiments, for example in which a human driver may control the drive system 110.

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, in certain embodiments, the control system 102 is coupled to the braking system 106, the steering system 108, and the drive system 110.

Also as depicted in FIG. 1, in various embodiments, the control system 102 includes a camera 120, a navigation system 122, a display 124, a transceiver 126, and a controller 140.

In various embodiments, the camera 120 obtains camera images pertaining to an environment outside the vehicle 100, such as a roadway or path on which the vehicle 100 is being operated, and as to other vehicles, pedestrians, objects, and/or other information pertaining to the environment outside the vehicle 100. In various embodiments, the camera 120 is disposed on or within the body 104 of the vehicle 100.

In various embodiments, the camera 120 may include one camera 120 or multiple cameras 120 disposed on one or more locations on or within the body 104 of the vehicle 100, such as at the front of the vehicle 100, at the rear of the vehicle 100, on or more sides of the vehicle 100, on a roof of the vehicle 100, and so on.

Also in various embodiments, the navigation system 122 (also referred to herein as a "location system") is configured to obtain and/or generate data as to a position and/or location in which the vehicle 100 is located and/or is travelling, and including weather conditions of the location (including temperature and other current weather condition values). In certain embodiments, the navigation system 122 comprises and/or or is coupled to a satellite-based network and/or system, such as a global positioning system (GPS) and/or other satellite-based system.

In certain embodiments, the vehicle 100 also includes a transceiver 126. In various embodiments, the transceiver 126 receives information regarding the location in which the vehicle 100 is being operated and about weather conditions at the location (e.g., in concert with the navigation system 122 in certain embodiments).

In various embodiments, the display 124 provides camera images for a driver and/or for one or more other users of the vehicle 100. In various embodiments, the display 124 provides enhanced camera images that are filtered to mitigate the effects on the camera images of the weather conditions, as performed by the controller 140 in accordance with steps of the process 200 of FIGS. 2 and 3 as described in greater detail further below. In certain embodiments, the display 124 may provide the enhanced camera images on a display, such as a light emitting diode (LED) and/or other type of visual display screen within the body 104 of the vehicle 100.

In various embodiments, the controller 140 is coupled to the camera 120, the navigation system 122, the transceiver 126, and the display 124. Also in various embodiments, the controller 140 comprises a computer system, and includes a processor 142, a memory 144, an interface 146, a storage device 148, and a computer bus 149. In various embodiments, the controller (or computer system) 140 controls camera images from the camera 120 and provides enhancement for frames that include the camera images, including during adverse weather conditions, based on the camera images obtained from the camera 120 and the location and weather data obtained from the navigation system 122 (and, also in various embodiments, also from data obtained via the transceiver 126). In various embodiments, the controller 140 provides instructions for the displaying of the enhanced camera images on the display 124. In addition, in certain embodiments, the controller 140 may also control one or more other vehicle functions (e.g., movement and/or other control of the vehicle 100 via the drive system 110, braking system 106, and/or steering system 108) based on the enhanced camera images, among other possible functions. In various embodiments, the controller 140 provides these and other functions in accordance with the steps of the processes and implementations depicted in FIGS. 2 and 3 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 149. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 2 and 3 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 150 along with stored values 156 (e.g., that may include map data, weather data, threshold values, or the like).

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the camera 120 and/or the navigation system 122. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 150 that executes one or more embodiments of the processes and implementations of FIGS. 2 and 3 and as described further below in connection therewith. In another exemplary embodiment, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
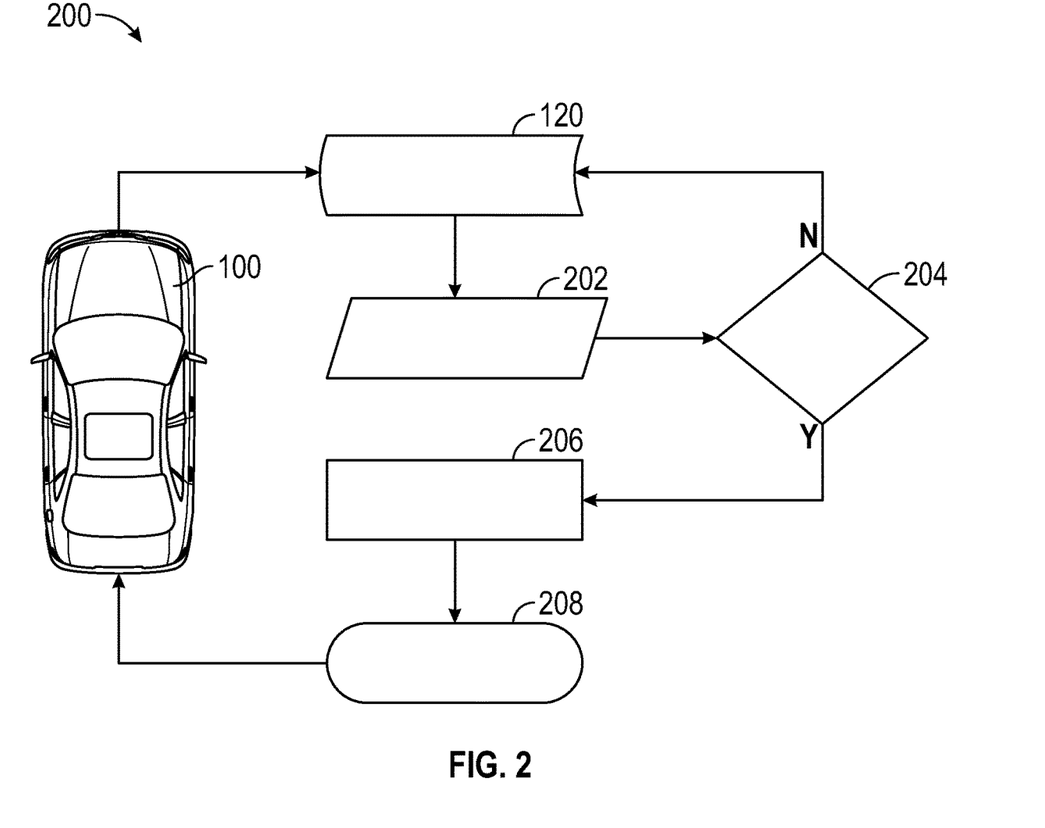
FIG. 2 is a flowchart of a process for controlling camera images, including during adverse weather conditions, in accordance with exemplary embodiments.

With reference to FIG. 2, a flowchart is provided of a process 200 for controlling camera images, including during adverse weather conditions, in accordance with exemplary embodiments. In various embodiments, the process 200 may be implemented in connection with the vehicle 100, including the control system 102 of FIG. 1, including the components thereof. Also in various embodiments, the process 200 is further described below in connection with FIG. 3, which depicts an exemplary implementation of the process 200 of FIG. 2.

As depicted in FIG. 2, the process 200 begins when the vehicle 100 of FIG. 1 is started when the vehicle 100 begins operating in a precipitation removal mode (e.g., when the vehicle 100 begins operating and the precipitation removal mode is selected by the driver and/or other user of the vehicle 100). In various embodiments, the process 200 continues until the precipitation removal mode is no longer selected by the user and/or when the vehicle 100 operation terminates.

In various embodiments, frames are acquired (step 202). In various embodiments, frames from camera images are acquired via one or more cameras 120 of FIG. 1 for processing by the processor 142 of FIG. 1.

Also in various embodiments, a determination is made as to whether the frames require enhancement (step 204). In various embodiments, this determination is made by the processor 142 of FIG. 1 based on the quality of the images in the frames as well as data obtained as to weather conditions surrounding the vehicle 100 (e.g., as obtained via the navigation system 122 and/or the transceiver 126 of FIG. 1).

In various embodiments, if it is determined in step 204 that the frames do not require enhancement, then enhancement is not performed on the images. Instead, the process returns to step 202 in a new iteration with additional frames obtained via the cameras 120. In various embodiments, steps 202-204 thereafter repeat in subsequent iterations with updated frames from the camera 120 until either (a) a determination is made during an iteration of step 204 that enhancement is required for the frames; or (b) the vehicle operation using the precipitation removal mode terminates.

Conversely, in various embodiments, if it is instead determined in step 204 that the frames require enhancement, then the frames are processed (step 206). In various embodiments, the processor 142 of FIG. 1 processes the frames utilizing image processing techniques described in greater detail further below in connection with the flowchart of FIG. 3. In various embodiments, the processing of step 206 yields processed (or enhanced) frames 208 for the camera images that mitigate the effects of precipitation on the frames, including by utilizing a difference frame and removing pixels that represent the precipitation on the frames, as described in greater detail further below in connection with FIG. 3. In various embodiments, the processed (or enhanced) frames 208 are provided to the vehicle 100 for display on a screen of the display 124 of FIG. 1 in accordance with instructions provided by the processor 142 of FIG. 1. In addition, certain embodiments, the enhanced camera images may also be used to control movement of the vehicle 100, for example via control instructions that are provided by the processor 142 and that are implemented by the braking system 106, the steering system 108, and/or the drive system 110.

Figure 3:
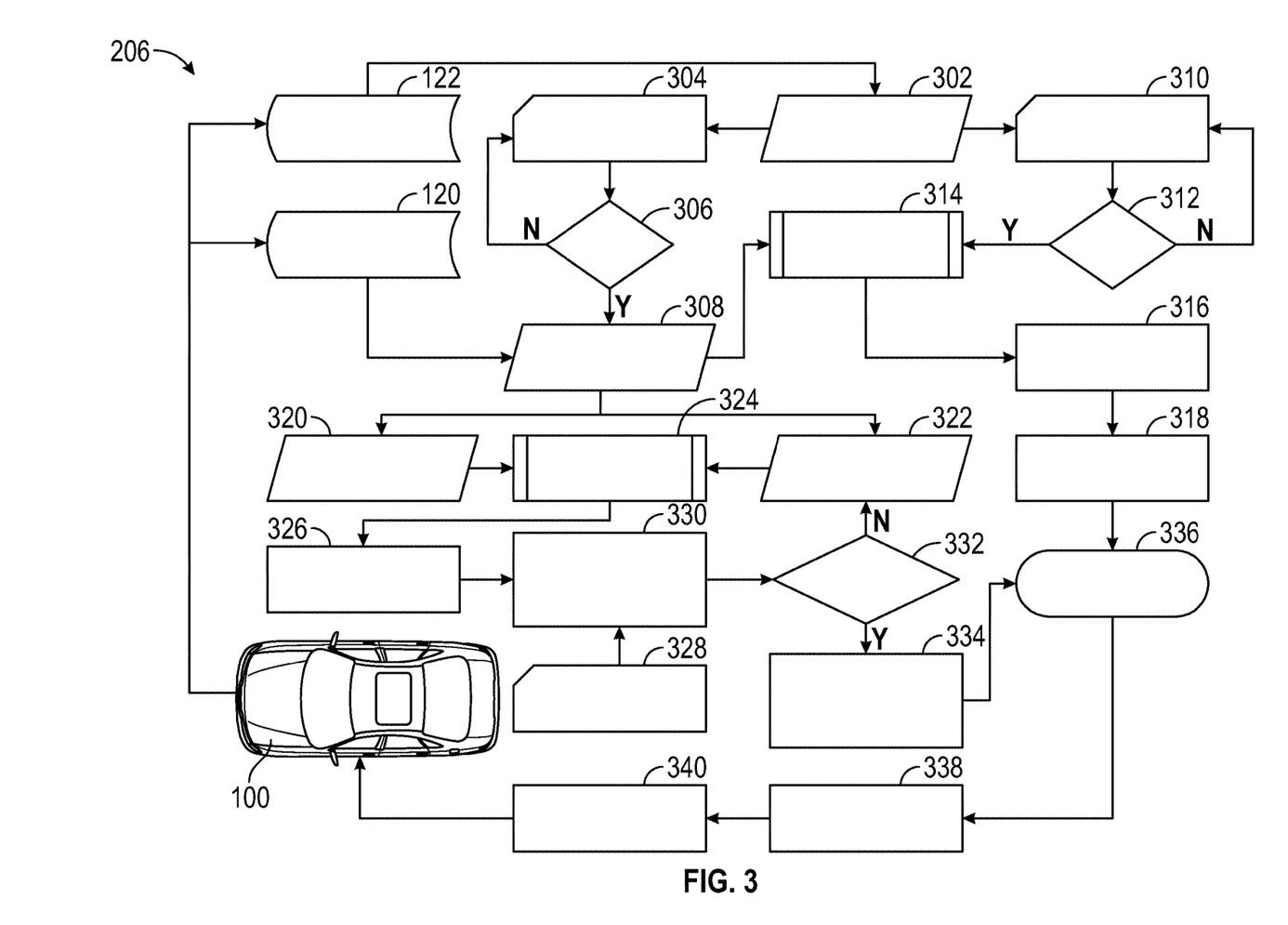
FIG. 3 is a flowchart of an implementation corresponding to a step of the process of FIG. 2, including for enhancing camera images during adverse weather conditions, in accordance with exemplary embodiments.

FIG. 3 is a flowchart of an implementation corresponding to step 206 of the process 200 of FIG. 2, including for enhancing camera images during adverse weather conditions, in accordance with exemplary embodiments.

As depicted in FIG. 3, weather information is obtained (step 302). In various embodiments, the current position (e.g., geographic location) of the vehicle 100 is obtained, along with weather information pertaining to the position. In certain embodiments, the position and weather information are obtained via the navigation system 122 of FIG. 1 (e.g., via one or more remote servers, information providers, or the like) and provided to the processor 142 of FIG. 1 for processing. Also in various embodiments, weather information may also be obtained via the transceiver 126 of the vehicle 100, for example from one or weather services, remote services, and/or other third parties. In certain embodiments, one or more temperature values, as well as one or more other current weather values, such as measures of fog and/or precipitation (e.g., rain, snow, sleet, hail) are obtained via the navigation system 122 (and in certain embodiments via the transceiver 126) with respect to the position in which the vehicle 100 is located and/or is currently travelling.

In certain embodiments, the weather information is compared with one or more threshold values as to whether snow is present (step 304). In various embodiments, during step 304, the processor 142 of FIG. 1 compares temperature values and/or other current weather information values from step 302 with one or more threshold values (e.g., as stored in the memory 144 as stored values 156 thereof).

In various embodiments, a determination is made as to whether snow is present (step 306). Specifically, in various embodiments, the processor 142 of FIG. 1 determines that snow is present (e.g., when snow is present as reflected in the camera images) based on the comparison of the temperature values and/or other weather information values, along with processing of the camera images via the processor 142.

In various embodiments, if it is determined in step 306 that snow is not present, then the process returns to step 304. In various embodiments, steps 304 and 306 thereafter repeat (e.g., with new frames and updated weather information) until a determination is made in a subsequent iteration of step 306 that snow is present.

In various embodiments, once a determination is made during an iteration of step 306 that snow is present, then additional frames continue to be acquired (step 308) from the cameras 120. In various embodiments, the additional frames are utilized both in step 314 (calculating the contrast) and step 324 (determining an image difference), each as described separately further below.

With reference back to step 302, in various embodiments the weather information is also compared with one or more threshold values as to whether rain or fog are present (step 310). In various embodiments, during step 310, the processor 142 of FIG. 1 compares temperature values and/or other weather information values from step 302 with one or more threshold values (e.g., as stored in the memory 144 as stored values 156 thereof).

In various embodiments, a determination is made as to whether rain is present (step 312). Specifically, in various embodiments, the processor 142 of FIG. 1 determines that rain is present (e.g., when rain is present as reflected in the camera images) based on the comparison of the temperature values and/or other weather information values, along with processing of the camera images via the processor 142.

In various embodiments, if it is determined in step 312 that rain is not present, then the process returns to step 310. In various embodiments, steps 310 and 312 thereafter repeat (e.g., with new frames and updated weather information) until a determination is made in a subsequent iteration of step 310 that rain is present.

In various embodiments, once a determination is made during an iteration of step 310 that rain is present, then the process proceeds to the above-referenced step 314 (calculating the contrast), described directly below.

During step 314, a contrast level is calculated (step 314). Specifically, in various embodiments, a current contrast level is calculated for the camera images in the frames (e.g., as acquired in an iteration of step 308 and/or as acquired during step 202 of FIG. 2, as described above). In various, the contrast level is calculated by the processor 142 of FIG. 1 for the current camera images that are being affected by the snow (as determined in step 306) or the rain (as determined in step 312).

In various embodiments, the contrast value is adjusted (step 316). Specifically, in various embodiments, the processor 142 of FIG. 1 adjusts a gamma value of the frames in order to increase the contrast for the frames of the camera images. In addition, in various embodiments, the contrast of the frames is also further enhanced (step 318) by the processor 142. In various embodiments, the process proceeds to step 336, described further below.

With reference back to step 308, in various embodiments the acquired frames are utilized in determining an image difference (step 324). In various embodiments, a difference frame is generated from both a previous frame (n) 320 and a current frame (n+1) 322 obtained from the additional acquired frames at step 308 at sequential points in time. In various embodiments, the difference frame is generated by the processor 142 in step 324 by subtracting the previous frame (n) 320 from the current frame (n+1) 322 (e.g., by ascertaining pixels that appear in one image but not the other, or that change from one of the images to the other). Accordingly, in various embodiments, the difference frame comprises a frame that includes specific pixels that represent precipitation that has occurred (and that is captured in the frames of the camera image) between a first point in time corresponding to the previous frame (n) 320 and a second point in time corresponding to the current frame (n+1) 322.

In various embodiments, image pixels are normalized (step 326). Specifically, in various embodiments, the image pixels in the difference frame are normalized by the processor 142. Also in various embodiments, a filter is obtained (step 328). In various embodiments, one or more calibratable look up tables (LUT) are obtained from the memory 144 of FIG. 1 for use with respect to the pixels of the difference frame that represent the precipitation (e.g., that reflect the rain or snow).

In various embodiments, one or more image morphological openings are applied (step 330). In various embodiments, the processor 142 of FIG. 1 utilizes the filter of step 328 in conjunction with the normalized pixel images of step 326 in applying the image morphological openings of step 330 to the difference frame.

Also in various embodiments, a determination is made as to whether a quantity of pixels in the difference frame exceeds a predetermined threshold (step 332). In certain embodiments, the processor 142 of FIG. 1 determines whether the number of pixels in the difference frame exceeds a predetermined threshold, and/or whether the ratio or percentage of pixels in the difference frame (as compared, for example, to the current frame 322 or the previous frame 320) exceed a predetermined threshold. Also in various embodiments, as part of these determinations, the specific pixels are identified in the difference frame, for example the specific pixels that appear in the current frame 322 but not in the previous frame. In one exemplary embodiment, the predetermined threshold of step 332 is equal to approximately one eighth (referring to the fraction of pixels in the difference frame as compared with either the previous frame 320 or the current frame 322); however, this may vary in other embodiments.

In various embodiments, if is determined step 332 that the quantity of pixels in the difference frame does not exceed the predetermined threshold, then the process returns to step 322 in a new iteration. In various embodiments, the process proceeds to step 324 in a new iteration, with a new current frame 322 (e.g., at a new subsequent point in time). In various embodiments, steps 324-332 repeat in new iterations using additional new, current frames 322 until a determination is made in an iteration of step 332 that the quantity of pixels in the difference frame exceeds the predetermined threshold.

In various embodiments, once it is determined in step 334 that the quantity of pixels in the difference frame exceeds the predetermined threshold, then the process proceeds to step 334. In various embodiments, the current frame 322 is substituted for the previous frame 320. In various embodiments, this is performed by the processor 142 of FIG. 1.

In various embodiments, the substituted frame from step 334 is processed (step 336). In various embodiments, the substituted frame (e.g., the current frame 322) is further processed such that the additional pixels from the precipitation are filtered and removed from the frame. In various embodiments, only the pixels representing the precipitation are removed from the frame. Specifically, in certain embodiments, this is accomplished by filtering and removing the pixels from the difference frame (of step 324) from the current frame 322. In various embodiments, by removing the pixels representing the precipitation, this provides a more clear image of features of interest in the frame, such as the roadway or path in which the vehicle 100 is operating, and including any other vehicles, pedestrians, objects, and so on that may be of interest in the frames for the camera images. In addition, in various embodiments, the increased contrast of step 316 and the enhanced contrast 318 are also performed for or incorporated into the processed frame of step 336. Also in various embodiments, the various processing of step 336 is performed by the processor 142 of FIG. 1, and results in the generation of enhanced frames for the camera images.

In various embodiments, the processed (or enhanced) frames are displayed (step 338). Specifically, in various embodiments, the processed (or enhanced) frames of step 336 are displayed on a display screen of the display 124 of FIG. 1 in accordance with instructions provided by the processor 142 of FIG. 1. In various embodiments, the display of the processed frames provides an enhanced display for the driver or other users of the vehicle 100, for example in that a provides a clearer image of the roadway and/or objects surrounding the vehicle 100, after filtering and removing from the image the pixels that had represented precipitation.

In addition, in certain embodiments, the processed (or enhanced) frames are also utilized in one or more other aspects of vehicle control (step 340), such as movement of the vehicle 100. Specifically, in certain embodiments, the processor 142 provides instructions for automated control of braking, steering, acceleration, deceleration, and/or one or more other commands that are implemented via one or more of the braking system 106, the steering system 108, and/or the drive system 110 for control of one or more functions of the vehicle 100. In addition, in certain embodiments in which a human is driving the vehicle 100, the processor 142 may also make recommendations for actions for the driver to take in controlling the vehicle 100, such as for braking, steering, acceleration, deceleration, and/or one or more other recommendations for the driver to implement.

Accordingly, methods, systems, and vehicles are provided for controlling camera images for a vehicle. In various embodiments, the disclosed methods and systems receive information as to weather conditions surrounding the vehicle 100, and process the frames associated with the camera images to filter and remove pixels representing precipitation. In various embodiments, this provides for potentially clearer display and/or other usage of the camera images, without the obstruction of the precipitation in the frames.

In various embodiments, the techniques described herein may be used in connection with vehicles having a human driver, but that also have automatic functionality (e.g., automated parking and/or assisted driving). In various embodiments, the techniques described herein may also be used in connection autonomous vehicles, such as semi-autonomous and/or fully autonomous vehicles.

It will be appreciated that the systems, vehicles, and methods may vary from those depicted in the Figures and described herein. For example, the vehicle 100 of FIG. 1, the control system 102, and/or components thereof may differ from that depicted in FIG. 1. It will similarly be appreciated that the steps of the processes and implementations of FIGS. 2 and 3 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining camera images from a camera of a vehicle;
   obtaining weather data as to a location in which the vehicle is travelling;
   determining, via a processor of the vehicle, whether precipitation is present at the location, based on the weather data; and
   when it is determined by the processor that precipitation is present:
      processing the camera images, via a processor, generating one or more processed frames from the camera images, based on the weather data, at sequential points in time, generated a plurality of sequential frames comprising a first frame at a first point in time and a second frame at a second point in time;
      generating, via the processor, a difference frame that includes specific pixels that appear in one of the plurality of sequential frames and not the other;
      normalizing and filtering image pixels of the difference frame via the processor;
      applying, via the processor, morphological openings to the image pixels of the difference frame via the processor in conjunction with the normalized pixel images, when it is determined via the processor that precipitation is present;
      determining, via the processor, a ratio of pixels in the difference frame compared to pixels in the first frame, pixels in the second frame, or both, and whether the ratio exceeds a predetermined threshold;
      when it is determined that the ratio of pixels in the difference frame does not exceed the predetermined threshold, then repeating the normalizing, filtering, and applying of the morphological openings via the processor without substituting the frames of the camera images in which the precipitation is present and without removing the pixels that are present in the difference frame and that reflect the precipitation, until a subsequent determination is made by the processor that the quantity of pixels in the difference frame exceeds the predetermined threshold;
      when it is instead determined that the ratio of pixels in the difference frame exceeds the predetermined threshold, then substituting the frames of the camera images in which the precipitation is present and removing the pixels that are present in the difference frame and that reflect the precipitation, generating one or more enhanced frames, via the processor; and
      performing a control action for the vehicle, in accordance with the instructions provided by the processor in accordance with instructions provided by the processor, based on the one or more enhanced frames.

2. The method of claim 1, wherein:
   the step of obtaining the weather data comprises obtaining one or more current weather values from a remote server, using a navigation system of the vehicle; and
   the step of processing the camera images comprises processing the camera images, via the processor, based on the one or more current weather values obtained from the remote server.

3. The method of claim 1, wherein the step of performing the control action further comprises automatically controlling movement of the vehicle based on the one or more processed frames when it is determined by the processor that precipitation is present, in accordance with the instructions provided by the processor.

4. The method of claim 1, further comprising:
increasing contrast for the camera images via the processor by adjusting a gamma value of the frames of the camera images when it is determined by the processor that precipitation is present; and
displaying the one or more processed frames, with the increased contrast, on a screen of a display of the vehicle for a user of the vehicle, via a display system in accordance with instructions provided by the processor.

5. The method of claim 1, further comprising:
determining, via the processor using the weather data, a temperature of the location; and
determining, via the processor, whether the precipitation is rain or snow, based on temperature;
wherein the step of processing the camera images comprises processing the camera images, via the processor, in a different manner depending upon whether the precipitation is rain or snow, namely:
using a first process when the precipitation is determined to be rain; and
using a second process, different from the first process, when the precipitation is determined to be snow.

6. The method of claim 5, wherein the step of processing the camera images comprises:
when the precipitation is determined to be snow:
increasing the contrast for the camera images via the processor by adjusting a gamma value of the frames of the camera images when the snow is present; and
substituting frames of the camera images in which the snow is present, wherein the substituting of the frames is performed by the processor based on a difference frame that is determined via the processor based on differences between a first frame obtained at a first point in time and a second frame obtained at a second point in time, and further by removing, via the processor, pixels that are present in the difference frame and that reflect the snow; and
when the precipitation is determined to be rain instead of snow, increasing the contrast for the camera images via the processor by adjusting a gamma value of the frames of the camera images when the rain is present, without the substituting of the frames of the camera images.

7. The method of claim 1, wherein the predetermined threshold is equal to one eighth.

8. The method of claim 1, further comprising:
when it is determined that the ratio of pixels in the difference frame exceeds the predetermined threshold, after the substituting of the frames of the camera images in which the precipitation is present and removing the pixels that are present in the difference frame and that reflect the precipitation, then displaying, via the processor, the enhanced frames resulting from the substituting of the frames and the removing of the pixels, along with recommendations for a driver of the vehicle to follow for controlling movement of the vehicle via recommended braking, acceleration, or deceleration of the vehicle, in accordance with instructions provided by the processor.

9. A system comprising:
a camera configured to obtain camera images for a vehicle;
a processor coupled to the camera and configured to at least facilitate:
obtaining weather data as to a location in which the vehicle is travelling;
determining whether precipitation is present at the location, based on the weather data; and
when it is determined by the processor that precipitation is present:
processing the camera images, via a processor, generating one or more processed frames from the camera images, based on the weather data, at sequential points in time, generated a plurality of sequential frames comprising a first frame at a first point in time and a second frame at a second point in time;
generating, via the processor, a difference frame that includes specific pixels that appear in one of the plurality of sequential frames and not the other;
normalizing and filtering image pixels of the difference frame via the processor;
applying, via the processor, morphological openings to the image pixels of the difference frame via the processor in conjunction with the normalized pixel images, when it is determined via the processor that precipitation is present;
determining, via the processor, a ratio of pixels in the difference frame compared to pixels in the first frame, pixels in the second frame, or both, and whether the ratio exceeds a predetermined threshold;
when it is determined that the ratio of pixels in the difference frame does not exceed the predetermined threshold, then repeating the normalizing, filtering, and applying of the morphological openings via the processor without substituting the frames of the camera images in which the precipitation is present and without removing the pixels that are present in the difference frame and that reflect the precipitation, until a subsequent determination is made by the processor that the quantity of pixels in the difference frame exceeds the predetermined threshold;
when it is instead determined that the ratio of pixels in the difference frame exceeds the predetermined threshold, then substituting the frames of the camera images in which the precipitation is present and removing the pixels that are present in the difference frame and that reflect the precipitation, via the processor; and
performing a control action for the vehicle, in accordance with the instructions provided by the processor in accordance with instructions provided by the processor, based on the one or more enhanced frames.

10. The system of claim 9, wherein the processor is further configured to at least facilitate automatically controlling movement of the vehicle based on the one or more processed frames when it is determined by the processor that precipitation is present, in accordance with the instructions provided by the processor.

11. The system of claim 9, wherein:
the processor is further configured to at least facilitate increasing contrast for the camera images by adjusting a gamma value of the frames of the camera images when it is determined by the processor that precipitation is present; and
the system further comprises a display system configured to display the one or more processed frames, with the increased contrast, on a screen of a display of the vehicle for a user of the vehicle, in accordance with instructions provided by the processor.

12. The system of claim 9, wherein the processor is further configured to at least facilitate:
determining, using the weather data, a temperature of the location;
determining whether the precipitation is rain or snow, based on temperature; and
processing the camera images in a different manner depending upon whether the precipitation is rain or snow, namely:
using a first process when the precipitation is determined to be rain; and
using a second process, different from the first process, when the precipitation is determined to be snow.

13. The system of claim 12, wherein the processor is further configured to at least facilitate:
when the precipitation is determined to be snow:
increasing the contrast for the camera images via the processor by adjusting a gamma value of the frames of the camera images when the snow is present; and
substituting frames of the camera images in which the snow is present, wherein the substituting of the frames is performed by the processor based on a difference frame that is determined via the processor based on differences between a first frame obtained at a first point in time and a second frame obtained at a second point in time, and further by removing, via the processor, pixels that are present in the difference frame and that reflect the snow; and
when the precipitation is determined to be rain instead of snow, increasing the contrast for the camera images via the processor by adjusting a gamma value of the frames of the camera images when the rain is present, without the substituting of the frames of the camera images.

14. The system of claim 9, wherein the predetermined threshold is equal to one eighth.

15. A vehicle comprising:
a body;
a drive system configured to generate movement of the body;
a camera disposed on or within the body and configured to obtain camera images; and
a processor disposed within the body and coupled to the camera, the processor and configured to at least facilitate:
obtaining weather data as to a location in which the vehicle is travelling;
determining whether precipitation is present at the location, based on the weather data; and
when it is determined by the processor that precipitation is present:
processing the camera images, via a processor, generating one or more processed frames from the camera images, based on the weather data, at sequential points in time, generated a plurality of sequential frames comprising a first frame at a first point in time and a second frame at a second point in time;
generating, via the processor, a difference frame that includes specific pixels that appear in one of the plurality of sequential frames and not the other;
normalizing and filtering image pixels of the difference frame via the processor;
applying, via the processor, morphological openings to the image pixels of the difference frame via the processor in conjunction with the normalized pixel images, when it is determined via the processor that precipitation is present;
determining, via the processor, a ratio of pixels in the difference frame compared to pixels in the first frame, pixels in the second frame, or both, and whether the ratio exceeds a predetermined threshold;
when it is determined that the ratio of pixels in the difference frame does not exceed the predetermined threshold, then repeating the normalizing, filtering, and applying of the morphological openings via the processor without substituting the frames of the camera images in which the precipitation is present and without removing the pixels that are present in the difference frame and that reflect the precipitation, until a subsequent determination is made by the processor that the quantity of pixels in the difference frame exceeds the predetermined threshold;
when it is instead determined that the ratio of pixels in the difference frame exceeds the predetermined threshold, then substituting the frames of the camera images in which the precipitation is present and removing the pixels that are present in the difference frame and that reflect the precipitation, via the processor; and
performing a control action for the vehicle, in accordance with the instructions provided by the processor in accordance with instructions provided by the processor, based on the one or more enhanced frames.

16. The vehicle of claim 15, further comprising:
a navigation system configured to obtain one or more current weather values from a remote server;
wherein the processor is coupled to the navigation system and configured to at least facilitate processing the camera images based on the one or more current weather values obtained via the navigation system from the remote server.

17. The vehicle of claim 15, wherein:
the processor is further configured to at least facilitate increasing contrast for the camera images by adjusting a gamma value of the frames of the camera images when it is determined by the processor that precipitation is present; and
the system further comprises a display system configured to display the one or more processed frames, with the increased contrast, on a screen of a display of the vehicle for a user of the vehicle, in accordance with instructions provided by the processor.

18. The vehicle of claim 15, wherein the processor is further configured to at least facilitate:
determining, using the weather data, a temperature of the location;
determining whether the precipitation is rain or snow, based on temperature; and
processing the camera images in a different manner depending upon whether the precipitation is rain or snow, namely:
using a first process when the precipitation is determined to be rain; and
using a second process, different from the first process, when the precipitation is determined to be snow.

19. The vehicle of claim 18, wherein the processor is further configured to at least facilitate:
when the precipitation is determined to be snow:

increasing the contrast for the camera images via the processor by adjusting a gamma value of the frames of the camera images when the snow is present; and substituting frames of the camera images in which the snow is present, wherein the substituting of the frames is performed by the processor based on a difference frame that is determined via the processor based on differences between a first frame obtained at a first point in time and a second frame obtained at a second point in time, and further by removing, via the processor, pixels that are present in the difference frame and that reflect the snow; and when the precipitation is determined to be rain instead of snow, increasing the contrast for the camera images via the processor by adjusting a gamma value of the frames of the camera images when the rain is present, without the substituting of the frames of the camera images.

20. The vehicle of claim 15, wherein the predetermined threshold is equal to one eighth.

* * * * *